United States Patent
Kawada

(10) Patent No.: US 9,831,489 B2
(45) Date of Patent: Nov. 28, 2017

(54) POSITIVE-ELECTRODE ACTIVE MATERIAL FOR NON-AQUEOUS ELECTROLYTE SECONDARY BATTERY AND NON-AQUEOUS ELECTROLYTE SECONDARY BATTERY INCLUDING THE SAME

(71) Applicant: Panasonic Corporation, Osaka (JP)

(72) Inventor: Hiroshi Kawada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 394 days.

(21) Appl. No.: 14/489,496

(22) Filed: Sep. 18, 2014

(65) Prior Publication Data

US 2015/0093646 A1   Apr. 2, 2015

(30) Foreign Application Priority Data

Sep. 30, 2013   (JP) .................................. 2013-205041

(51) Int. Cl.
| | |
|---|---|
| H01M 4/1315 | (2010.01) |
| H01M 4/505 | (2010.01) |
| C01B 11/22 | (2006.01) |
| H01M 4/525 | (2010.01) |
| C01B 11/20 | (2006.01) |

(Continued)

(52) U.S. Cl.
CPC ........... *H01M 4/1315* (2013.01); *C01B 11/20* (2013.01); *C01B 11/22* (2013.01); *C01G 53/50* (2013.01); *H01M 4/505* (2013.01); *H01M 4/525* (2013.01); *C01P 2002/50* (2013.01); *C01P 2006/40* (2013.01); *C01P 2006/80* (2013.01); *H01M 2004/028* (2013.01)

(58) Field of Classification Search
CPC ........... H01M 4/1315; H01M 4/13915; H01M 4/505; H01M 4/52; H01M 4/525; H01M 4/582

See application file for complete search history.

(56) References Cited

U.S. PATENT DOCUMENTS

2009/0297947 A1* 12/2009 Deng .................. H01M 4/0471
                                                            429/218.1
2010/0062339 A1*  3/2010 Pan ....................... H01M 4/131
                                                            429/231.95

(Continued)

FOREIGN PATENT DOCUMENTS

JP        2012-204281        10/2012

OTHER PUBLICATIONS

Kim et al., "Amorphous Manganese Oxyiodides Exhibiting High Lithium Intercalation Capacity at Higher Current Density," Electrochemical and Solid-State Letters, 2 (2) 55-57, available electronically Nov. 18, 1998.*

(Continued)

*Primary Examiner* — Ula C Ruddock
*Assistant Examiner* — Amanda Barrow
(74) *Attorney, Agent, or Firm* — McDermott Will & Emery LLP

(57) ABSTRACT

A positive-electrode active material for a non-aqueous electrolyte secondary battery according to the present disclosure contains a layered lithium (Li)-containing transition metal composite oxide that contains Li in the transition metal layer and more than 0.4 μmol/g and less than 25 μmol/g of iodine (I) or bromine (Br).

7 Claims, 1 Drawing Sheet

(51) Int. Cl.
   *C01G 53/00* (2006.01)
   *H01M 4/02* (2006.01)

(56) References Cited

U.S. PATENT DOCUMENTS

| | | | | |
|---|---|---|---|---|
| 2010/0173202 | A1* | 7/2010 | Saito | C01G 51/50 |
| | | | | 429/224 |
| 2011/0017946 | A1* | 1/2011 | Choi | C01G 45/1242 |
| | | | | 252/182.1 |
| 2012/0052375 | A1* | 3/2012 | Johnson | C01G 53/44 |
| | | | | 429/206 |
| 2012/0070725 | A1* | 3/2012 | Venkatachalam | H01M 4/1397 |
| | | | | 429/188 |

OTHER PUBLICATIONS

Paulsen et al, O2 Structure Li2/3[Ni1/3Mn2/3]O2: A New Layered Cathode Material for Rechargeable Lithium Batteries, J. Electrochem. Soc., 147 (3) 861-868 (2000—month not listed).*
Paulsen et al, "Layered T2-, O6-, O2-, and P2- Type A2/3[M'2+1/3M4+2/3]O2 Bronzes, A= Li, Na; M'= Ni, Mg; M= Mn, Ti," Chem. Mater. 2000, 12, 2257-2267, Published on Web Jul. 11, 2000.*
Hwang et al., Local Crystal Structure around Manganese in New Potassium-Based Nanocrystalline Manganese Oxyiodide, J. Phys. Chem. B 2002, 106, 4053-4060, Published on Web Mar. 30, 2002.*
Kim et al, "A manganese oxyiodide cathode for rechargeable lithium batteries," Nature, vol. 390, 265-267, Nov. 20, 1997.*

* cited by examiner

POSITIVE-ELECTRODE ACTIVE MATERIAL FOR NON-AQUEOUS ELECTROLYTE SECONDARY BATTERY AND NON-AQUEOUS ELECTROLYTE SECONDARY BATTERY INCLUDING THE SAME

BACKGROUND

1. Technical Field

The present disclosure relates to a positive-electrode active material for a non-aqueous electrolyte secondary battery and a non-aqueous electrolyte secondary battery including the positive-electrode active material.

2. Description of the Related Art

A lithium-containing transition metal oxide that has been studied as one of next-generation positive-electrode active materials is produced by ion exchange of a sodium-containing transition metal oxide, belongs to the space group P6$_3$mc, and has the O2 structure. Such a lithium-containing transition metal oxide used as a positive-electrode active material is expected to have higher structural stability and capacity than lithium cobalt oxide (LiCoO$_2$), which is practically used, belongs to the space group R-3m, and has the O3 structure. Japanese Unexamined Patent Application Publication No. 2012-204281 discloses a lithium-containing transition metal oxide that has the O2 structure and contains Li in the transition metal layer.

However, the positive-electrode active material disclosed in Japanese Unexamined Patent Application Publication No. 2012-204281 requires a high activation voltage for initial charging and has poor battery performance.

SUMMARY

The present disclosure provides a positive-electrode active material for a non-aqueous electrolyte secondary battery that has high battery performance, particularly that requires a lower activation voltage for initial charging.

A positive-electrode active material for a non-aqueous electrolyte secondary battery according to the present disclosure contains a layered lithium composite transition metal oxide, which contains Li in the transition metal layer, and more than 0.4 µmol/g and less than 25 µmol/g of iodine or bromine.

The present disclosure can improve battery performance and particularly lower the activation voltage for initial charging.

DETAILED DESCRIPTION

Finding that Underlies the Present Disclosure

Figure 1:
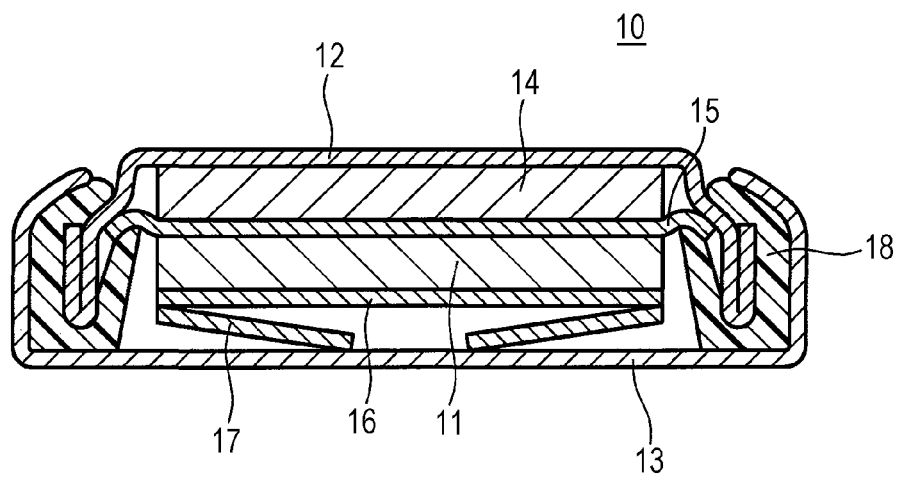
FIG. 1 is a schematic view of a coin-type battery according to Examples 1 and 2 and Comparative Examples 1 and 2.

As in the technique disclosed in Japanese Unexamined Patent Application Publication No. 2012-204281, a lithium-ion battery that contains, as a positive-electrode active material, a lithium-containing transition metal oxide that contains Li in the transition metal layer requires activation at a high voltage in initial charging in order to increase the discharge capacity. However, a higher charging activation voltage results in a greater likelihood of degradation of an electrolytic solution and a separator of a non-aqueous electrolyte secondary battery. As a result of extensive studies, the present inventors found that the addition of iodine (I) or bromine (Br) to a positive-electrode active material can lower the activation voltage for initial charging.

On the basis of the finding, the present inventors arrived at the following aspects of the present invention.

A positive-electrode active material for a non-aqueous electrolyte secondary battery according to a first aspect of the present disclosure is a positive-electrode active material for a non-aqueous electrolyte secondary battery, which contains a layered lithium-containing transition metal composite oxide that contains Li in a transition metal layer thereof, and more than 0.4 µmol/g and less than 25 µmol/g of iodine (I) or bromine (Br).

In accordance with the first aspect, in the non-aqueous electrolyte secondary battery that contains, as a positive-electrode active material, the positive-electrode active material for a non-aqueous electrolyte secondary battery, which contains a lithium (Li)-containing transition metal oxide that contains Li in the transition metal layer, the positive-electrode active material contains more than 0.4 µmol/g and less than 25 µmol/g of iodine (I) or bromine (Br). In the lithium-ion battery that contains, as a positive-electrode active material, the lithium-containing transition metal oxide that contains Li in the transition metal layer, the iodine (I) or bromine (Br) in the positive-electrode active material can lower the activation voltage for initial charging and increase the discharge capacity.

Although the mechanism for producing such effects is not sufficiently known, the following is one probable mechanism. The presence of iodine (I) or bromine (Br), which has a reducing effect, in the active material decreases the valence of the transition metal or oxygen in the active material and thereby lowers the electric potential for charging. Thus, the non-aqueous electrolyte secondary battery can be activated without increasing the activation voltage for initial charging. The lowered activation voltage for initial charging can retard degradation of an electrolytic solution and a separator of the non-aqueous electrolyte secondary battery, thereby suppressing deterioration in battery performance and increasing the discharge capacity. Furthermore, the presence of iodine (I) or bromine (Br), which has a reducing effect, in the active material decreases the valence of the transition metal or oxygen in the active material and thereby facilitates Li entering the transition metal layer during discharge. This increases the discharge capacity. This is the probable mechanism for producing the effects.

This can lower the charging activation voltage, increase the discharge capacity, and retard degradation of the electrolytic solution and the separator of the non-aqueous electrolyte secondary battery. This can improve battery performance and particularly lower the activation voltage for initial charging.

In accordance with a second aspect, the positive-electrode active material according to the first aspect may be represented by the general formula Li$_x$Na$_a$[Li$_y$M$_{1-y}$]O$_{2-\alpha+\alpha}$I$_{2c}$, where M contains at least one of Ni, Co, and Mn, 0.67<x<1.1, 0<y<0.33, 0.0001≤a≤0.1, and −0.1≤α≤0.1.

A variable x of 1.1 or more results in an increased amount of residual alkali on a surface of the lithium-containing transition metal oxide, possibly resulting in gelation of a slurry in a battery manufacturing process, a decreased amount of transition metal for an oxidation-reduction reaction, and a decreased capacity. A variable x of more than 0.67 results in an increased discharge capacity. A variable x of less than 1.1 can result in the prevention of the problems described above. A variable y of more than 0 indicates the presence of Li in the transition metal layer. A variable y of less than 0.33 results in a stable crystal structure even in the case of charging to a high electric potential, for example, 4.8 V (vs. Li/Li$^+$).

In accordance with a third aspect, for example, the I in the first or second aspect may be deposited on a surface of the Li-containing transition metal composite oxide.

In accordance with a fourth aspect, x in the general formula in the second or third aspect may be in the range of 0.83<x<1.1.

A variable x of more than 0.83 results in a further increased capacity.

In accordance with a fifth aspect, the arrangement of the transition metal, oxygen, and Li of the positive-electrode active material according to any one of the first to fourth aspects may have at least one of the O2 structure, T2 structure, and O6 structure.

A lithium-containing transition metal oxide having any of the O2 structure, O6 structure, and T2 structure has little disorder resulting from metal ion transfer into Li ion sites associated with charge/discharge. When a known lithium-containing transition metal oxide having such a structure is used as a positive-electrode active material, however, there is the problem of a high charging activation voltage from the start to the end of charging. In accordance with the fifth aspect, even in the case of activation at a high voltage in initial charging, the degradation of the electrolytic solution and the separator can be retarded by lowering the charging activation voltage.

A non-aqueous electrolyte secondary battery according to a sixth aspect of the present disclosure is a non-aqueous electrolyte secondary battery, which includes a positive electrode containing a positive-electrode active material according to Claim 1, a negative electrode, and a non-aqueous electrolyte.

In accordance with the sixth aspect, in the non-aqueous electrolyte secondary battery that contains, as a positive-electrode active material, the positive-electrode active material for a non-aqueous electrolyte secondary battery, which contains a lithium-containing transition metal oxide that contains Li in the transition metal layer, the positive-electrode active material contains more than 0.4 µmol/g and less than 25 µmol/g of iodine (I) or bromine (Br). In the lithium-ion battery that contains, as a positive-electrode active material, the lithium-containing transition metal oxide that contains Li in the transition metal layer, because of the reducing effect of iodine (I) or bromine (Br), the iodine (I) or bromine (Br) in the positive-electrode active material can lower the activation voltage for initial charging and increase the discharge capacity.

This enables activation at a low charging activation voltage and can retard degradation of the electrolytic solution and the separator of the non-aqueous electrolyte secondary battery. This can improve battery performance and particularly lower the activation voltage for initial charging.

A method for producing a positive-electrode active material for a non-aqueous electrolyte secondary battery according to a seventh aspect of the present disclosure includes allowing a positive-electrode active material precursor sodium-containing transition metal oxide to react with Li or LiBr to produce a positive-electrode active material containing I or Br, and washing the positive-electrode active material such that the content of I or Br contained in the positive-electrode active material is more than 0.4 µmol/g and less than 25 µmol/g.

In accordance with the seventh aspect, because of its reducing effect, the iodine (I) or bromine (Br) can improve battery performance and particularly lower the activation voltage for initial charging. Thus, the positive-electrode active material for a non-aqueous electrolyte secondary battery thus produced has a high discharge capacity.

A method for producing a positive-electrode active material for a non-aqueous electrolyte secondary battery according to an eighth aspect of the present disclosure may further include applying a charging activation voltage of less than 4.46 V (vs. Li/Li$^+$) to the washed positive-electrode active material after the washing.

The eighth aspect can provide a method for producing a positive-electrode active material for a non-aqueous electrolyte secondary battery that has improved battery performance and particularly requires an activation voltage of 4.46 V (vs. Li/Li$^+$) for initial charging.

The present disclosure will be further described in the following embodiments. A non-aqueous electrolyte secondary battery according to one embodiment of the present disclosure includes a positive electrode containing a positive-electrode active material, a negative electrode, and a non-aqueous electrolyte containing a non-aqueous solvent. Preferably, a separator is disposed between the positive electrode and the negative electrode. The non-aqueous electrolyte secondary battery may include an electrode body composed of the positive electrode and the negative electrode wound or layered with a separator interposed therebetween and a non-aqueous electrolyte in a battery case.

[Positive Electrode]

The positive electrode may be composed of a positive-electrode current collector, such as a metal foil, and a positive-electrode active material layer formed on the positive-electrode current collector. The positive-electrode current collector may be a metal foil that is stable in the electric potential range of the positive electrode or a film covered with a metal that is stable in the electric potential range of the positive electrode. The metal that is stable in the electric potential range of the positive electrode may be aluminum (Al). The positive-electrode active material layer may contain a conductive agent and a binder in addition to the positive-electrode active material. The positive-electrode active material layer may be formed by applying a mixture of a conductive agent, a binder, and the positive-electrode active material in an appropriate solvent to the positive-electrode current collector, drying the mixture, and extending the mixture by rolling.

The positive-electrode active material contains a lithium-containing transition metal oxide and contains a transition metal, oxygen, sodium, lithium, and a minute amount of iodine. The lithium-containing transition metal oxide of the positive-electrode active material in a discharged state or an unreacted state is represented by the general formula $Li_xNa_a[Li_yM_{1-y}]O_{2-c+\alpha}I_{2c}$, wherein M contains at least one of Ni, Co, and Mn, 0.67<x<1.1, 0<y<0.33, 0.0001≤a≤0.1, −0.1<α<0.1, and 2c is more than 0.4 µmol/g and less than 25 µmol/g based on the weight of the positive-electrode active material.

A variable x of more than 0.67 results in a high capacity. However, x of 1.1 or more results in an increased amount of residual alkali on a surface of the lithium-containing transition metal oxide, possibly resulting in gelation of a slurry in a battery manufacturing process, a decreased amount of transition metal for an oxidation-reduction reaction, and a decreased capacity. Thus, x is preferably more than 0.67 and less than 1.1. More preferably, x is more than 0.83 and less than 1.1.

A variable y of 0.33 or more results in an unstable crystal structure in the case of charging to a high electric potential of 4.8 V (vs. Li/Li$^+$), for example. When y is less than 0.33, a lithium-containing transition metal oxide according to the present disclosure is resistant to crystal decay caused by lithium ion desorption at a high positive-electrode potential and can have stable charge/discharge characteristics. A variable y of more than 0 indicates the presence of Li in the transition metal layer. Thus, y is preferably more than 0 and less than 0.33.

M contains at least one metal element selected from Ni, Co, and Mn. Ni is preferred in terms of high capacity. Co is preferred in terms of the formation of a transition metal layer containing lithium that contributes to high capacity. Mn is preferred in terms of thermal stability and cost. The lithium-containing transition metal oxide may contain at least one selected from the group consisting of magnesium (Mg), titanium (Ti), iron (Fe), tin (Sn), zirconium (Zr), niobium (Nb), molybdenum (Mo), tungsten (W), and bismuth (Bi). If necessary, the lithium-containing transition metal oxide may contain an element or elements, such as F, B, P, and/or S, in addition to the metal elements.

α corresponds to the oxygen deficiency or oxygen excess of the lithium-containing transition metal oxide. Thus, α is preferably −0.1 or more and 0.1 or less.

A variable a of 0.0001 or more results in a greater interplanar spacing for lithium ion transfer and improved charge/discharge characteristics. However, a of more than 0.1 may result in a smaller number of sites to be occupied by lithium ions and a lower capacity. Thus, a is preferably 0.0001 or more and 0.1 or less.

A variable 2c of more than 0.4 μmol/g results in a low activation voltage for initial charging. However, 2c of 25 μmol/g or more may result in frequent self-discharge and gas evolution in charge/discharge cycles. Thus, 2c is preferably more than 0.4 μmol/g and less than 25 μmol/g based on the weight of the active material.

The crystal structure of the lithium-containing transition metal oxide is preferably at least one of the O2 structure, T2 structure, and O6 structure. More preferably, the crystal structure of the lithium-containing transition metal oxide belongs to the space group P6$_3$mc and is the O2 structure. In the O2 structure, lithium occupies the center of the oxygen octahedron, and there are two overlapping forms between oxygen and a transition metal in one unit cell. Such a layered structure includes a lithium layer, a transition metal layer, and an oxygen layer. In the general formula, the lithium layer contains Li$_x$. The transition metal layer contains Li$_y$M$_{1-y}$. The oxygen layer contains O$_{2-o+\alpha}$.

In the synthesis of the lithium-containing transition metal oxide having the O2 structure, lithium-containing transition metal oxides having the O6 structure and T2 structure may simultaneously be synthesized as by-products. The positive-electrode active material may contain lithium-containing transition metal oxides having the O6 structure and T2 structure synthesized as by-products. In the O6 structure, which belongs to the space group R-3m, lithium occupies the center of the oxygen octahedron, and there are six overlapping forms between oxygen and a transition metal in one unit cell. In the T2 structure, which belongs to the space group Cmca, lithium occupies the center of the oxygen tetrahedron, and there are two overlapping forms between oxygen and a transition metal in one unit cell.

Also in the lithium-containing transition metal oxide having the O3 structure, the presence of Li in the transition metal layer is expected to improve the energy density. However, because of disorder resulting from metal ion transfer into Li ion sites associated with charge/discharge, the O3 structure may be responsible for poor battery performance. Such disorder is negligible in the O2 structure, O6 structure, and T2 structure. Thus, positive-electrode active materials having the O2 structure, O6 structure, and T2 structure are promising.

However, the positive-electrode active material that contains a lithium-containing transition metal oxide having the O2, O6, and T2 structure requires a high activation voltage for initial charging and a high final charging voltage. Thus, a high charging voltage is applied to the positive-electrode active material throughout charging. A known lithium-containing transition metal oxide having the O2, O6, and T2 structure used as a positive-electrode active material requires a high charging activation voltage from the start to the end of charging. A high charging activation voltage results in degradation of an electrolytic solution and a separator. Even in the case of activation at a high voltage in initial charging, the present inventors have proposed to lower the charging activation voltage to retard degradation of an electrolytic solution and a separator. The present inventors found the relationship between the charging activation voltage and the iodine or bromine content in which the charging activation voltage can be lowered when a positive-electrode active material containing a lithium-containing transition metal oxide contains a predetermined amount of iodine or bromine.

More specifically, the iodine or bromine content of the positive-electrode active material containing a lithium-containing transition metal oxide is preferably more than 0.4 μmol/g and less than 25 μmol/g. When the iodine or bromine content is in this range, the charging activation voltage is less than 4.46 V (vs. Li/Li$^+$). Although the charging activation voltage may be less than 4.46 V even when the lower limit of the iodine or bromine content is 0.2 μmol/g, 0.4 μmol/g is preferred to control the iodine or bromine content. Iodine or bromine is preferably contained in at least the surface of the positive-electrode active material in terms of ion-conducting property.

The positive-electrode active material containing a lithium-containing transition metal oxide is preferably synthesized by synthesizing a sodium-containing transition metal oxide and replacing Na of the sodium-containing transition metal oxide with Li by ion exchange. Such a method may include adding a molten salt bed containing lithium iodide or lithium bromide to a sodium-containing metal oxide. Alternatively, a sodium-containing metal oxide may be immersed in a solution containing lithium iodide or lithium bromide.

It is desirable that the amount of lithium iodide and lithium bromide in the molten salt bed be 0.05 equivalents or more and less than 3 equivalents of the sodium-containing transition metal oxide. A smaller amount of lithium iodide and lithium bromide than the lower limit may be difficult to uniformly distribute throughout the active material. It may also be difficult to control the lithium iodide and lithium bromide content by washing when the amount of lithium iodide and lithium bromide is greater than the upper limit.

After the ion exchange, for example, the product can be washed with distilled water and then with alcohol and dried to yield a lithium-containing transition metal oxide. The iodine or bromine content of the lithium-containing transition metal oxide can be adjusted in the washing process. The iodine or bromine content probably depends on the washing conditions, such as the stirring time, the amount of distilled water for immersion, and the amount of distilled water or alcohol to be added dropwise in suction filtration. A lithium-containing transition metal oxide containing more than 0.4 μmol/g and less than 25 μmol/g of iodine or bromine can be produced by optimizing the washing conditions in this washing process.

The positive-electrode active material may contain other metal oxides belonging to various space groups in the form of a mixture or a solid solution without compromising the objects of the present disclosure. Preferably, the lithium-containing transition metal oxide preferably constitutes more than 50 vol %, more preferably 70 vol % or more, of the total volume of compounds constituting the positive-electrode active material.

The conductive agent is used to increase the electric conductivity of the positive-electrode active material layer. The conductive agent may be a carbon material, such as carbon black, acetylene black, ketjen black, or graphite. These may be used alone or in combination. The conductive agent content preferably ranges from 0% to 30% by mass, more preferably 0% to 20% by mass, still more preferably 0% to 10% by mass, of the total mass of the positive-electrode active material layer.

The binder is used to maintain good contact in the positive-electrode active material and between the positive-electrode active material and the conductive agent and improve the binding property of the positive-electrode active material on a surface of a positive-electrode current collector.

Examples of the binder include polytetrafluoroethylene (PTFE), polyvinylidene fluoride, polyvinylacetate, polymethacrylate, polyacrylate, polyacrylonitrile, polyvinyl alcohol, and mixtures thereof. The binder may be used in combination with a thickener, such as carboxymethyl cellulose (CMC) or polyethylene oxide. The binder content preferably ranges from 0% to 30% by mass, more preferably 0% to 20% by mass, still more preferably 0% to 10% by mass, of the total mass of the positive-electrode active material layer.

The final charging potential of the positive electrode having the structure described above in initial charging can be 4.3 V (vs. Li/Li$^+$) or more with respect to lithium metal. The final charging potential of the positive electrode is preferably 4.5 V (vs. Li/Li$^+$) or more, more preferably 4.6 V (vs. Li/Li$^+$) or more, in terms of activation of the positive-electrode active material.

[Negative Electrode]

The negative electrode may include a negative-electrode current collector, such as a metal foil, and a negative-electrode active material layer formed on the negative-electrode current collector. The negative-electrode current collector may be a metal foil that rarely forms an alloy with lithium in the electric potential range of the negative electrode or a film covered with a metal that rarely forms an alloy with lithium in the electric potential range of the negative electrode. The metal that rarely forms an alloy with lithium in the electric potential range of the negative electrode is preferably copper, which is inexpensive, is easy to process, and has a good electronic conductive property. The negative-electrode active material layer may contain a negative-electrode active material and a binder. The negative-electrode active material layer may be formed by applying a mixture of a negative-electrode active material and a binder in water or an appropriate solvent to the negative-electrode current collector, drying the mixture, and extending the mixture by rolling.

The negative-electrode active material may be any material that can intercalate and deintercalate lithium ions. Examples of the negative-electrode active material include carbon materials, metals, alloys, metal oxides, metal nitrides, and carbon and silicon containing an alkali metal. Examples of the carbon materials include natural graphite, artificial graphite, and pitch-based carbon fibers. Examples of the metals and alloys include lithium (Li), silicon (Si), tin (Sn), germanium (Ge), indium (In), gallium (Ga), lithium alloys, silicon alloys, and tin alloys. The negative-electrode active materials may be used alone or in combination. Lithium metal is preferably used in the characteristic evaluation of the positive electrode.

Examples of the binder include fluorinated polymers and rubber polymers as in the positive electrode. The binder is preferably a styrene-butadiene copolymer (SBR), which is a rubber polymer, or a modified product thereof. The binder may be used in combination with a thickener, such as carboxymethyl cellulose (CMC).

[Non-Aqueous Electrolyte]

The non-aqueous electrolyte contains a non-aqueous solvent, an electrolyte salt that can dissolve in the non-aqueous solvent, and an additive agent. The non-aqueous electrolyte may be an electrolytic solution, which is a liquid non-aqueous electrolyte, or a solid electrolyte. The non-aqueous electrolyte is preferably an electrolytic solution in terms of Li ion diffusion.

The electrolyte salt is a lithium salt, which is generally used as a supporting salt in known non-aqueous electrolyte secondary batteries. Such a lithium salt may be LiPF$_6$, LiBF$_4$, or LiClO$_4$. These lithium salts may be used alone or in combination.

The non-aqueous solvent is preferably a fluorine-containing organic solvent (at least one hydrogen atom of which is substituted with a fluorine atom), because the fluorine-containing organic solvent is resistant to decomposition even in the case of charging to a high electric potential of more than 4.5 V, for example. Examples of the fluorine-containing organic solvent include fluorine-containing cyclic ester carbonates, fluorine-containing cyclic carboxylic acid esters, fluorine-containing cyclic ethers, fluorine-containing chain carbonic acid esters, fluorine-containing chain ethers, fluorine-containing nitriles, and fluorine-containing amides. More specifically, the fluorine-containing cyclic ester carbonates include fluoroethylene carbonate (FEC), difluoroethylene carbonate (DFEC), and trifluoro propylene carbonate. The fluorine-containing cyclic carboxylic acid esters include fluoro-γ-butyrolactone (FGBL). The fluorine-containing chain esters include fluoroethyl methyl carbonate (FEMC), difluoroethyl methyl carbonate (DFEMC), and fluorodimethyl carbonate (FDMC).

Particularly preferred is a mixture of a fluorine-containing cyclic ester carbonate 4-fluoroethylene carbonate (FEC), which is a high-dielectric solvent, and a chain carbonic acid ester fluoroethyl methyl carbonate (FEMC), which is a low-viscosity solvent. The FEC:FEMC ratio is preferably 1:3 on a volume basis.

The non-aqueous solvent may be a fluorine-free organic solvent. Examples of the fluorine-free organic solvent include cyclic ester carbonates, cyclic carboxylic acid esters, cyclic ethers, chain carbonic acid esters, chain carboxylic acid esters, chain ethers, nitriles, and amides. More specifically, the cyclic ester carbonates include ethylene carbonate (EC) and propylene carbonate (PC). The cyclic carboxylic acid esters include γ-butyrolactone (GBL). The chain esters include ethyl methyl carbonate (EMC) and dimethyl carbonate (DMC). However, such a non-aqueous solvent alone has low dielectric strength. Thus, such a non-aqueous solvent is preferably used in combination with a fluorine-containing organic solvent or an additive agent.

An additive agent to be added to the electrolytic solution forms an ion-permeable film on a surface of a positive electrode or a negative electrode before the electrolytic solution decomposes on the surface of the positive electrode or the negative electrode and thereby functions as a surface film forming agent for preventing the decomposition of the electrolytic solution on the surface of the positive electrode or the negative electrode. The surface of the positive electrode or the negative electrode, as used herein, refers to an interface between the electrolytic solution and the positive-electrode active material or the negative-electrode active material that contributes to the reaction, that is, the surface of the positive-electrode active material layer or the negative-electrode active material layer and the surface of the positive-electrode active material or the negative-electrode active material.

Examples of the additive agent include vinylene carbonate (VC), ethylene sulfite (ES), cyclohexyl benzene (CHB), o-terphenyl (OTP), and lithium bis(oxalate) borate (Li-BOB). The additive agents may be used alone or in combination. The additive agent content of the electrolytic solution may be such that the film can be successfully formed and preferably ranges from 0% to 2% by mass of the total amount of the electrolytic solution.

[Separator]

The separator is an ion-permeable and insulative porous film disposed between the positive electrode and the negative electrode. Examples of the porous film include microporous thin films, woven fabrics, and nonwoven fabrics. The material of the separator is preferably polyolefin, more specifically, polyethylene, polypropylene, or the like.

EXAMPLES

Although the present disclosure will be further described in the following examples, the present disclosure is not limited to these examples.

Example 1

Production of Lithium-Containing Transition Metal Oxide (Positive-Electrode Active Material)

Nickel sulfate ($NiSO_4$), cobalt sulfate ($CoSO_4$), and manganese sulfate ($MnSO_4$) were mixed in an aqueous solution at a stoichiometric ratio of 0.13:0.13:0.74 and were coprecipitated to yield a precursor (Ni,Co,Mn) $(OH)_2$. The precursor, sodium carbonate ($Na_2CO_3$), and lithium hydroxide monohydrate ($LiOH.H_2O$) were mixed at a stoichiometric ratio of 0.85:0.74:0.15. This mixture was held at 900° C. for 10 hours to yield a sodium-containing transition metal oxide having the P2 structure. The main component of the sodium-containing transition metal oxide belongs to the space group $P6_3/mmc$.

The composition of the sodium-containing transition metal oxide was analyzed with an inductively coupled plasma (ICP) emission spectrophotometric analyzer (Thermo Fisher Scientific, trade name "iCAP6300"). The analysis result was Na:Li:Mn:Co:Ni=0.756:0.145:0.625:0.115:0.115.

Five equivalents (25 g) of a molten salt bed prepared by mixing lithium nitrate and lithium chloride at a mole ratio of 88:12 was added to 5 g of the product. Furthermore, 0.1 molar equivalent of lithium iodide was added to the product. The resulting mixture was then held at 280° C. for 2 hours to replace sodium of the sodium-containing transition metal oxide with lithium by ion exchange.

After 30 g of the ion-exchanged substance was stirred in 500 ml of distilled water for 5 minutes, suction filtration using 300 ml of distilled water yielded a lithium-containing transition metal oxide containing iodine.

The composition of the lithium-containing transition metal oxide was analyzed with an inductively coupled plasma (ICP) emission spectrophotometric analyzer (Thermo Fisher Scientific, trade name "iCAP6300"). The analysis result was Na:Li:Mn:Co:Ni=0.0005:0.889:0.625:0.115:0.115. The result shows that sodium of the sodium-containing transition metal oxide was replaced with an equivalent amount of lithium by ion exchange.

The amount of iodine (I) in the lithium-containing transition metal oxide was measured by burning the lithium-containing transition metal oxide and analyzing the evolved gas by gas chromatography (Varian Inc., trade name "CP2002", detector: thermal conductivity detector). The analysis result showed that the amount of iodine was 1.103 μmol/g.

The iodine (I) quantitative analysis showed that the iodine content of the lithium-containing transition metal oxide was 1.103 μmol/g. In this production method, the iodine content depended greatly on the washing conditions. It is therefore assumed that iodine was deposited on the surface of the lithium-containing transition metal oxide. However, since lithium iodide was used in the synthesis as an iodine source to replace Na of the sodium-containing transition metal oxide with Li by ion exchange, it is assumed that iodide was also contained within the structure of the lithium-containing transition metal oxide.

The crystal structure of the lithium-containing transition metal oxide was determined with an X-ray powder diffractometer (Rigaku Corp., trade name "RINT 2200"). The diffraction pattern was subjected to Rietveld refinement. The analysis showed that the crystal structure was the O2 structure belonging to the space group $P6_3mc$, and the lithium-containing transition metal oxide was $Li_{0.744}Na_{0.0005}$ $[Li_{0.145}Mn_{0.625}Co_{0.115}Ni_{0.115}]O_{2-\Delta}I_{2\Delta}$. $2\Delta$ corresponds to the iodine content (1.103 μmol/g) measured using the gas chromatography.

[Preparation of Electrolytic Solution]

A non-aqueous solvent was prepared by mixing 4-fluoroethylene carbonate (FEC) and fluoroethyl methyl carbonate (FEMC) at a volume ratio of 1:3. An electrolytic solution was prepared by dissolving an electrolyte salt $LiPF_6$ in the non-aqueous solvent at a concentration of 1.0 μmol/L.

[Manufacture of Coin-Type Non-Aqueous Electrolyte Secondary Battery]

A coin-type non-aqueous electrolyte secondary battery (hereinafter referred to as a coin-type battery) was manufactured through the following procedure. FIG. 1 is a schematic view of a coin-type battery 10. First, a lithium-containing transition metal oxide, which is a positive-electrode active material, a conductive agent acetylene black, and a binder polyvinylidene fluoride were mixed at a mass ratio of 80:10:10 in N-methyl-2-pyrrolidone to prepare a slurry. The slurry was applied to an aluminum foil current collector, which is a positive-electrode current collector, and was dried at 110° C. under vacuum to produce a positive electrode 11.

A coin-shaped battery case was then prepared. The coin-shaped battery case included a sealing plate 12 and a case 13. A lithium metal foil having a thickness of 0.3 mm was attached as a negative electrode 14 to the inside of the sealing plate 12 in dry air having a dew point of −50° C. or less. A separator 15 was placed on the negative electrode 14. The positive electrode 11 was placed on the separator 15 such that the positive-electrode active material layer faced the separator 15. A stainless steel backing plate 16 and a stainless steel disc spring 17 were disposed on the positive-electrode current collector. After the sealing plate 12 was filled with an electrolytic solution, the sealing plate 12 was fitted into the case 13 through a gasket 18, thus manufacturing the coin-type battery 10.

Example 2

A coin-type battery 10 was manufactured in the same manner as in Example 1 except that the stirring time in the washing process in the manufacture of the lithium-containing transition metal oxide was 1 minute.

Example 3

A coin-type battery 10 was manufactured in the same manner as in Example 1 except that 0.2 molar equivalent of lithium iodide was added to the product before ion exchange in the manufacture of the lithium-containing transition metal oxide.

Example 4

A coin-type battery 10 was manufactured in the same manner as in Example 3 except that the stirring time in the washing process in the manufacture of the lithium-containing transition metal oxide was 10 minutes.

Comparative Example 1

A coin-type battery 10 was manufactured in the same manner as in Example 1 except that the stirring time in the washing process in the manufacture of the lithium-containing transition metal oxide was 30 minutes.

The lithium-containing transition metal oxides produced in Example 2 and Comparative Example 1 were subjected to the composition analysis, crystal structure analysis, and iodine quantitative analysis using ICP spectroscopy in the same manner as in Example 1.

[Evaluation of Charging Activation Voltage]

Examples 1 and 2 and Comparative Example 1 were subjected to a charging test to measure the activation voltage for initial charging. An electrochemical measurement system manufactured by Solartron was used in the charging test. In the charging test, charging was performed to a battery voltage of 4.7 V at a constant current of 0.05 C. The charging activation voltage was a voltage at which dQ was maximum in the dQ/dV curve of a charging flat portion that appeared in the range of approximately 4.4 to 4.6 V.

[Evaluation of Discharge Capacity]

Examples 1 and 2 and Comparative Example 1 were subjected to a discharge test to measure the discharge capacity. In the discharge test after the charging test, discharge was performed to a battery voltage of 2.0 V at a constant current of 0.05 C. The discharge capacity was then determined.

Figure 2:
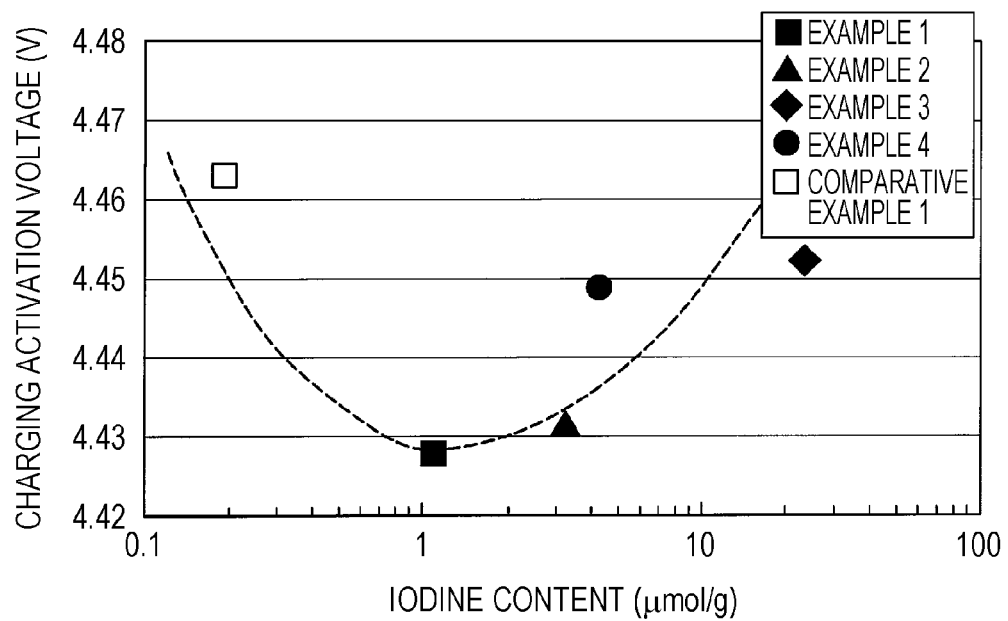
FIG. 2 is a graph showing the relationship between the iodine content and the charging activation voltage in embodiments of the present disclosure.

Table 1 summarizes the crystal structure, the amount of LiI added in ion exchange, the stirring time in washing, the iodine content, the charging activation voltage, and the discharge capacity in Examples 1 and 2 and Comparative Example 1. FIG. 2 shows the relationship between the iodine content and the charging activation voltage.

TABLE 1

|  | Crystal structure | Amount of LiI added [mol %] | Washing time [min] | Iodine content [μmol/g] | Charging activation voltage [V] | Discharge capacity [mAh] |
|---|---|---|---|---|---|---|
| Example 1 | O2 | 10 | 5 | 1.103 | 4.428 | 283.2 |
| Example 2 |  | 10 | 1 | 4.255 | 4.449 | 276.8 |
| Example 3 |  | 20 | 5 | 23.526 | 4.452 | 274.6 |
| Example 4 |  | 20 | 10 | 3.524 | 4.432 | 278.4 |
| Comparative example 1 |  | 10 | 30 | 0.189 | 4.463 | 254.7 |

Examples 1 to 4 and Comparative Example 1 were lithium-containing transition metal oxides synthesized from the same precursor by ion exchange. Table 1 shows that the iodine content varied with the amount of lithium iodide added in ion exchange and the stirring time in the washing process, and the iodine content decreased with increasing stirring time in the washing process. The adjustment of the iodine content in the washing process depends on not only the stirring time but also the amount of distilled water for immersion, the suction filtration frequency, and the amount of distilled water or alcohol added dropwise in the suction filtration. The iodine content can be adjusted through optimization of the washing conditions.

The charging activation voltage was lower in Examples 1 to 4 than in Comparative Example 1. As shown in FIG. 2, the relationship between the iodine content and the charging activation voltage is represented by a quadratic curve having a minimum charging activation voltage at a certain iodine content. The charging activation voltage reached a minimum of 4.43 V at an iodine content of approximately 1 μmol/g. The charging activation voltage increased as the iodine content decreased from 1 μmol/g. The charging activation voltage also increased as the iodine content increased from 1 μmol/g. In other words, when the iodine content is less than or equal to a first predetermined value or greater than or equal to a second predetermined value, which is greater than the first predetermined value, the charging activation voltage is greater than or equal to a predetermined voltage. In FIG. 2, for example, if the first predetermined value is 0.2 μmol/g, and the second predetermined value is 10 μmol/g, the predetermined voltage is 4.45 V. In accordance with the relationship between the charging activation voltage and the iodine content, the charging activation voltage can be decreased by adjusting the iodine content in the range of more than 0.4 μmol/g and less than 25 μmol/g. A decrease in charging activation voltage is synonymous with a decrease in overvoltage for charging, thus resulting in less degradation of an electrolytic solution and a separator. Although the mechanism by which the charging activation voltage was lower in Examples 1 to 4 than in Comparative Example 1 is not sufficiently clear, the following is a probable mechanism. The presence of iodine (I), which has a reducing effect, in the active material decreases the valence of the transition metal or oxygen in the active material. This can lower the electric potential required for charging and enables activation at a low charging activation voltage.

Table 1 shows that Examples 1 to 4 had higher discharge capacities than Comparative Example 1. In Comparative Example 1, it is surmised that a high activation voltage for initial charging caused degradation of the electrolytic solution and the separator, thus resulting in poor battery performance and a low discharge capacity. In Examples 1 to 4, the presence of iodine (I), which has a reducing effect, in the active material decreases the valence of the transition metal or oxygen in the active material and thereby facilitates Li entering the transition metal layer during discharge. This can increase the discharge capacity. Thus, in Examples 1 to 4, the charging activation voltage could be lowered by adjusting the iodine content in the range described above, and the discharge capacity was improved without deterioration in battery performance.

These results show that the application of a lithium-containing transition metal oxide that has a layered structure and contains more than 0.4 μmol/g and less than 25 μmol/g of iodine or bromine in the layered structure or on the surface of the layered structure to a positive-electrode active material for a non-aqueous electrolyte secondary battery can lower the charging activation voltage and retard degradation of battery constituent materials, such as an electrolytic solution and a separator.

What is claimed is:

1. A positive-electrode active material for a non-aqueous electrolyte secondary battery, comprising:
    a layered crystalline lithium (Li)-containing transition metal composite oxide that has a layered structure and contains Li in a transition metal layered thereof and sodium Na,
    wherein the positive-electrode active material is represented by the general formula $Li_xNa_a[Li_yM_{1-y}]O_{2-c+\alpha}I_{2c}$, where M contains at least one of Ni, Co, and Mn, $0.67<x<1.1$, $0<y<0.33$, $0.0001 \leq a \leq 0.1$, $-0.1 \leq \alpha \leq 0.1$, and c is calculated by:

$c$=an iodine content (mol/g)/(mol/g of the positive-electrode active material)/2, where 0.4 μmol/g<the iodine content<25 μmol/g, and the I is contained within the layered structure of the Li-containing transition metal composite oxide.

2. The positive-electrode active material for a non-aqueous electrolyte secondary battery according to claim 1, wherein:
    the I is also disposed on a surface of the Li-containing transition metal composite oxide.

3. The positive-electrode active material for a non-aqueous electrolyte secondary battery according to claim 1, wherein x in the general formula is in the range of $0.83<x<1.1$.

4. The positive-electrode active material for a non-aqueous electrolyte secondary battery according to claim 1, wherein the arrangement of the transition metal, oxygen, and Li of the positive-electrode active material has at least one of O2 structure, T2 structure, and O6 structure.

5. A non-aqueous electrolyte secondary battery, comprising:
    a positive electrode containing a positive-electrode active material according to claim 1;
    a negative electrode; and
    a non-aqueous electrolyte.

6. A method for producing the positive-electrode active material for a non-aqueous electrolyte secondary battery according to claim 1, comprising:
    allowing a positive-electrode active material precursor sodium-containing transition metal oxide to react with LiI to produce a positive-electrode active material containing I; and
    washing the positive-electrode active material such that the iodine content satisfies 0.4 μmol/g<the iodine content<25 μmol/g.

7. The method for producing the positive-electrode active material for a non-aqueous electrolyte secondary battery according to claim 6, further comprising: applying a charging activation voltage of less than 4.46 V (vs. Li/Li+) to the washed positive-electrode active material.

* * * * *